United States Patent
Arseniev et al.

(10) Patent No.: US 9,239,737 B2
(45) Date of Patent: Jan. 19, 2016

(54) CONCISE RESOURCE ADDRESSING

(71) Applicants: Alexey Arseniev, Hockenheim (DE);
Marek Barwicki, Schwetzingen (DE);
Markus Cherdron, Muehlhausen (DE);
Tzanko Stefanov, Karlsruhe (DE)

(72) Inventors: Alexey Arseniev, Hockenheim (DE);
Marek Barwicki, Schwetzingen (DE);
Markus Cherdron, Muehlhausen (DE);
Tzanko Stefanov, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/223,655

(22) Filed: Mar. 24, 2014

(65) Prior Publication Data
US 2015/0143386 A1    May 21, 2015

Related U.S. Application Data

(60) Provisional application No. 61/904,900, filed on Nov. 15, 2013.

(51) Int. Cl.
*G06F 9/54* (2006.01)
*G06F 9/50* (2006.01)
*G06F 17/30* (2006.01)

(52) U.S. Cl.
CPC ................ *G06F 9/5005* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 6,449,640 B1 | 9/2002 | Haverstock et al. | |
| 6,952,620 B2 | 10/2005 | Cherdron et al. | |
| 7,225,424 B2 | 5/2007 | Cherdron et al. | |
| 7,409,708 B2 | 8/2008 | Goodman et al. | |
| 7,581,204 B2 | 8/2009 | Reeder et al. | |
| 7,600,215 B2 | 10/2009 | Cherdron et al. | |
| 7,680,785 B2 | 3/2010 | Najork | |
| 7,797,370 B2 | 9/2010 | Brunswig et al. | |
| 7,925,968 B2 | 4/2011 | Fischer et al. | |
| 8,060,492 B2 | 11/2011 | Nair et al. | |
| 8,117,529 B2 | 2/2012 | Melamed et al. | |
| 8,407,297 B2 | 3/2013 | Schmidt-Karaca et al. | |
| 8,566,699 B2 | 10/2013 | Tomasic et al. | |
| 8,620,770 B1 | 12/2013 | Pope | |
| 8,645,300 B1 | 2/2014 | Cowdrey et al. | |

(Continued)

FOREIGN PATENT DOCUMENTS

CN    102880723 A    1/2013
EP    1406170 A2    4/2004

OTHER PUBLICATIONS

Eric Newcomer "Understanding Web Services", p. 1-4, TK5.888 .N482 2002, Pearson Education, Inc, ISBN 0201750813.*

(Continued)

*Primary Examiner* — H S Sough
*Assistant Examiner* — Abdou Seye
(74) *Attorney, Agent, or Firm* — Fish & Richardson P.C.

(57) ABSTRACT

The present disclosure involves systems, software, and computer-implemented methods for concise resource addressing. An example method includes receiving a request for an application including a resource identifier, the resource identifier including a textual identifier and a contextual identifier, the textual identifier including a textual description of the requested application, and the contextual identifier including an encoded description of the requested application; determining at least one target application associated with the resource identifier based at least in part on the textual identifier or the contextual identifier; and sending a response to the request include the at least one target application associated with the resource identifier.

26 Claims, 6 Drawing Sheets

(56) References Cited

U.S. PATENT DOCUMENTS

| | | |
|---|---|---|
| 2003/0237044 A1 | 12/2003 | Hayer et al. |
| 2004/0088210 A1 | 5/2004 | Tsyganskiy |
| 2005/0076311 A1 | 4/2005 | Kusterer et al. |
| 2006/0010229 A1 | 1/2006 | Chen et al. |
| 2008/0086490 A1* | 4/2008 | Paliwal et al. ............ 707/101 |
| 2011/0078203 A1 | 3/2011 | Cohen et al. |
| 2011/0209159 A1 | 8/2011 | Baratz et al. |
| 2012/0158693 A1 | 6/2012 | Papadimitriou et al. |
| 2012/0271941 A1 | 10/2012 | Mirandette et al. |
| 2013/0080641 A1 | 3/2013 | Lui et al. |
| 2013/0151994 A1* | 6/2013 | Marcella et al. ............ 715/760 |
| 2014/0181256 A1* | 6/2014 | Trifa et al. ............ 709/218 |

OTHER PUBLICATIONS

U.S. Appl. No. 13/904,561, filed May 29, 2013, Inventors: Andreas Kunz et al.

U.S. Appl. No. 14/228,658, filed Mar. 28, 2014, Inventors: Marek Barwicki et al.

* cited by examiner

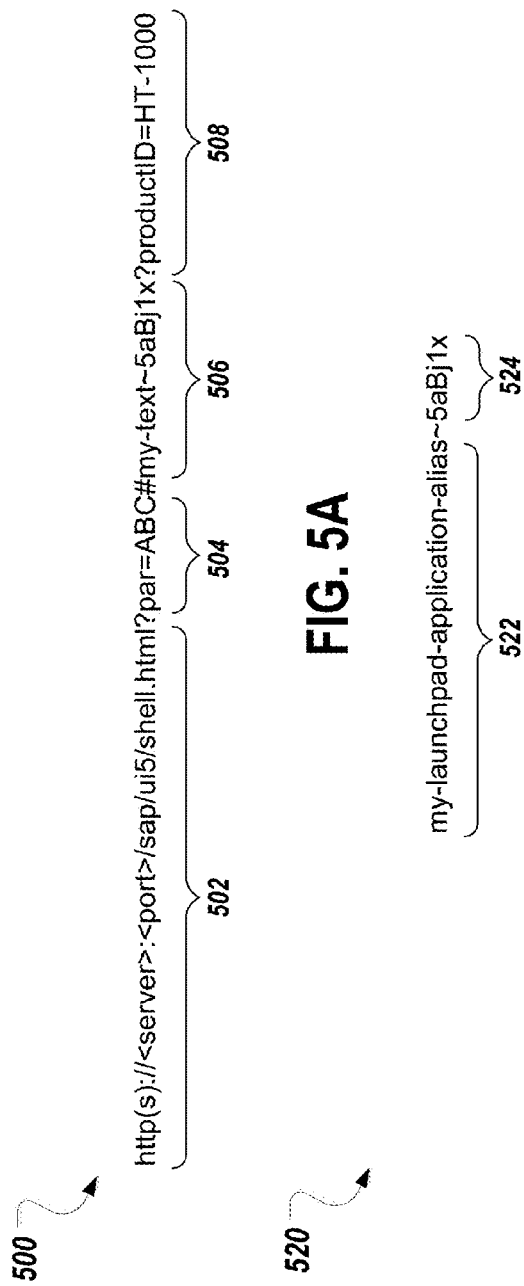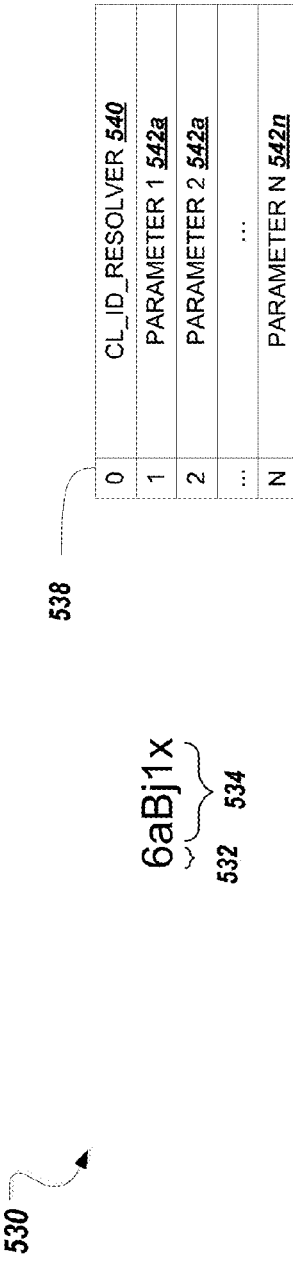

CONCISE RESOURCE ADDRESSING

CROSS REFERENCE TO RELATED APPLICATIONS

This application claims the benefit of priority of U.S. Provisional Application No. 61/904,900, filed Nov. 15, 2013, which is hereby incorporated by reference.

BACKGROUND

The present disclosure involves systems, software, and computer-implemented methods for providing concise resource addressing.

Network navigation may be performed using unique resource identifiers, such as uniform resource locators (URLs). In some cases, URLs may be used to address applications within a system. For example, the user may click on a link within a webpage displayed within a browser application to launch a specific application, or to perform a specific action. Such a click may generate a Hypertext Transfer Protocol (HTTP) request for the URL associated with a link. In response, the server receiving the request may invoke an application associated with the URL.

SUMMARY

The present disclosure involves systems, software, and computer-implemented methods for providing concise resource addressing. In one general aspect, an example method includes receiving a request for an application including a resource identifier, the resource identifier including a textual identifier and a contextual identifier, the textual identifier including a textual description of the requested application, and the contextual identifier including an encoded description of the requested application; determining at least one target application associated with the resource identifier based at least in part on the textual identifier or the contextual identifier; and sending a response to the request include the at least one target application associated with the resource identifier.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIG. 5A is an example of a URL including a resource identifier; FIG. 5B is an example resource identifier; FIG. 5C is an example contextual identifier and an example contextual table.

DETAILED DESCRIPTION

Figure 1:
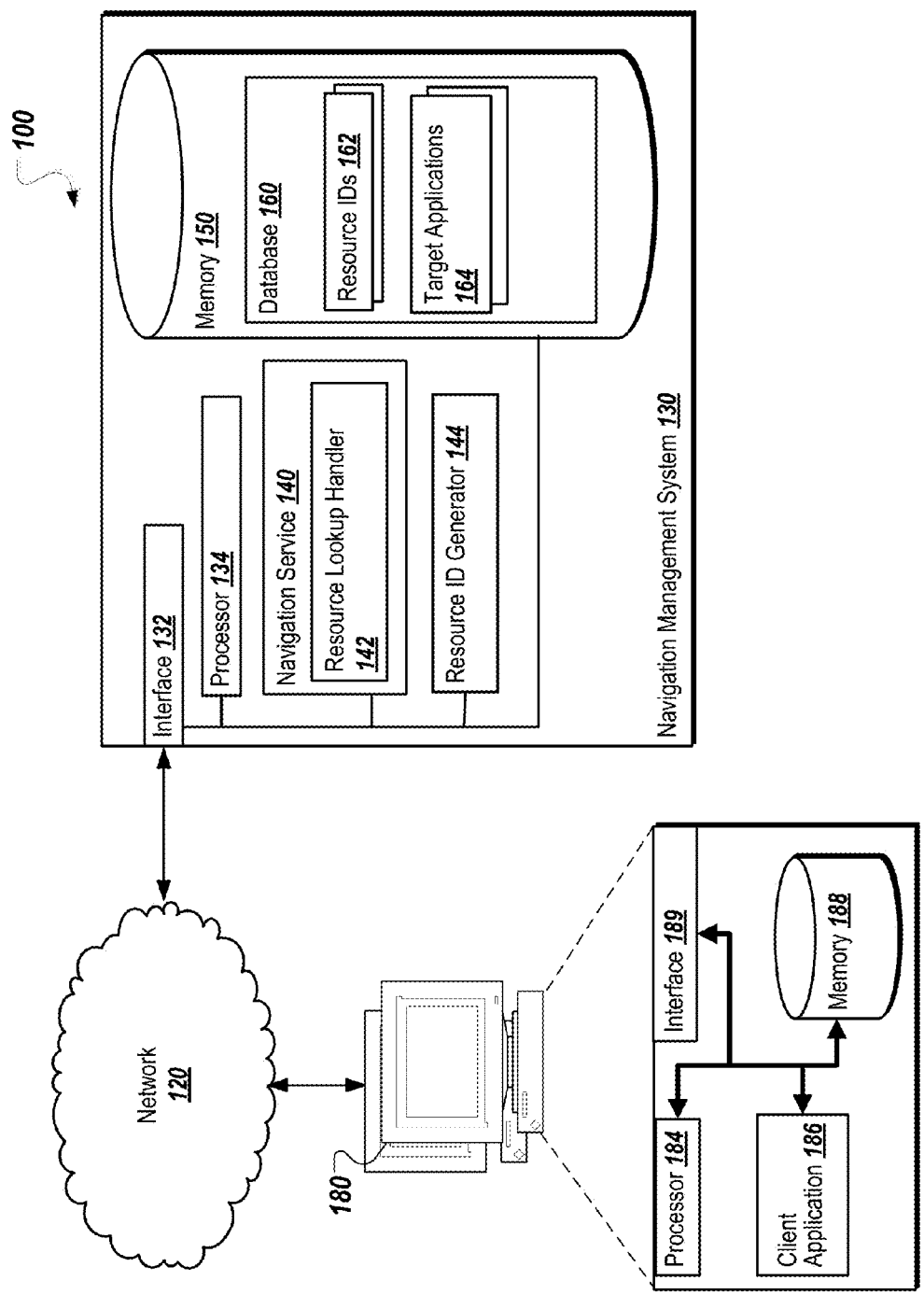
FIG. 1 is a block diagram illustrating an example environment for providing concise resource addressing.

The present disclosure involves systems, software, and computer-implemented methods for concise resource addressing.

The present disclosure describes a URL-based navigation scheme that allows for concise URLs that are also human-readable. The described solution allows creating and resolving human-readable, unique, and stable identifiers by supporting a dual identifier format. The identifier may be associated with a corresponding resolving service able to map the identifier to a fully qualified target application description.

In current navigation schemes, application URLs are often not homogenous, and may be long cryptic strings of characters that may not allow a human to discern the purpose of the application URL. Further, such URLs may be server specific, and thus not bookmark-able or shareable. Such application coupling may cause management difficulties, such as when a server in unavailable.

Many current navigation solutions also do not support free-form target addressing, such as allowing a user to directly type a URL in a browser's address box. Localization of navigation URLs may also be difficult using current schemes. Further, current solutions do not support assigning multiple target applications to a particular URL, such as based on user identity or role.

Accordingly, the present disclosure provides a scheme for concise resource addressing. In one example method, a request is received for an application including a resource identifier. The resource identifier may include a textual identifier including a description of the requested application, and a contextual identifier including an encoded description of the requested application. The contextual identifier may specify a particular resolver service to use for the resolving of the resource identifier, as well as zero or more parameters associated with the requested application. At least one target application associated with the resource identifier is then determined based at least in part on the textual identifier or the contextual identifier. A response to the request is then sent including the at least one target application associated with the resource identifier. In some implementations, such as if no target application is associated with the resource identifier, a response including zero target applications may be returned.

The present solution may provide several potential advantages. By providing a human readable navigation scheme, a user may be able to easily browse their navigation history and identify previously executed intents. The user may also be able to bookmark frequently used user intents. The navigation scheme further serves to decouple applications from one another, as an application designer will not have to include direct links to the application, which may change or become stale. The user may enter free form intent (not exactly matching) and get adequate response. The user can enter any intent text as resource id, and get suggested least of matching available intents.

FIG. 1 is a block diagram illustrating an example environment 100 for providing role-based resource navigation. As shown, the example environment 100 includes a navigation management system 130, one or more clients 180 connected to the navigation management system 130 by a network 120. In operation, the navigation management system 130 may receive a request from a client 180 to resolve a resource ID into a target application. The navigation management system 130 may send a response back to the client 180 including one or more associated target applications for the given resource ID. The navigation management system 130 may also be operable to generate resource IDs for target applications.

In the illustrated implementation, the example environment 100 includes a navigation management system 130. At a high level, the navigation management system 130 comprises an electronic computing device operable to receive navigation requests including resource IDs from the client 180 and provide target applications to the client. The navigation management system 130 may be a distributed system including different servers and components. In some implementations, the navigation management system 130 may be a combination of hardware components and software components. The navigation management system 130 may also be a single computing device.

In some implementations, the navigation management system 130 may be a web service that is accessible via standard web protocols, such as, for example, Hypertext Transfer Protocol (HTTP), Simple Object Access Protocol (SOAP), or any other suitable protocol or combination of protocols. In some cases, the navigation management system 130 may provide an Application Programming Interface (API) through which the client 180 may submit navigation requests.

As used in the present disclosure, the term "computer" is intended to encompass any suitable processing device. For example, although FIG. 1 illustrates a navigation management system 130, environment 100 can be implemented using two or more servers, as well as computers other than servers, including a server pool. Indeed, navigation management system 130 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated navigation management system 130 may be adapted to execute any operating system, including Linux, UNIX, Windows, Mac OS®, Java™, Android™, iOS or any other suitable operating system. According to one implementation, navigation management system 130 may also include or be communicably coupled with an e-mail server, a Web server, a caching server, a streaming data server, and/or other suitable server.

The navigation management system 130 also includes an interface 132, a processor 134, and a memory 150. The interface 132 is used by the navigation management system 130 for communicating with other systems in a distributed environment—including within the environment 100—connected to the network 120; for example, the clients 180, as well as other systems communicably coupled to the network 120 (not illustrated). Generally, the interface 132 comprises logic encoded in software and/or hardware in a suitable combination and operable to communicate with the network 120. More specifically, the interface 132 may comprise software supporting one or more communication protocols associated with communications such that the network 120 or interface's hardware is operable to communicate physical signals within and outside of the illustrated environment 100.

As illustrated in FIG. 1, the navigation management system 130 includes a processor 134. Although illustrated as a single processor 134 in FIG. 1, two or more processors may be used according to particular needs, desires, or particular implementations of environment 100. Each processor 134 may be a central processing unit (CPU), a blade, an application specific integrated circuit (ASIC), a field-programmable gate array (FPGA), or another suitable component. Generally, the processor 134 executes instructions and manipulates data to perform the operations of the navigation management system 130. Specifically, the processor 134 may execute the functionality required to receive and respond to requests from the clients 180.

In the illustrated implementation, the navigation management system 130 includes a navigation service 140. In some implementations, the navigation service 140 may be operable to perform the resource identifier to target application mapping. In some implementations, the navigation service 140 may be a software process or set of software processes executing on the navigation management system 130. The navigation service 140 may also be a network service executing on a separate computing device from the navigation management system 130. The navigation service 140 may utilize the interface 132 to send and receive data from the network 120, such as receiving requests from the one or more clients 180, and sending responses to these requests. The navigation service 140 may also utilize the memory 150 to read and write data needed for operation, such as resource identifiers, and target applications.

The navigation service 140 may include a resource lookup handler 142. In operation, the resource lookup handler 142 may be operable to receive a request including a resource ID, and parse the resource ID into a textual identifier in a contextual identifier. Parsing the resource identifier may include decoding the contextual identifier. In some implementations, decoding the contextual identifier may include reading and encoding scheme from within the contextual identifier, and then applying that encoding scheme to the contextual identifier. For example, such decoding may include decompressing the contextual identifier.

In some implementations, once the resource lookup handler 142 has parsed the resource identifier, it may query the database 160 to determine a set of target applications assigned to the requested resource ID. In some implementations, a resource ID may be associated with a single target application. A resource ID may also be associated with multiple target applications. In some implementations, the resource ID is not stored in the database 160, and information sufficient for resolving the resource ID is stored in the textual part of the identifier, the contextual part of the identifier, or in a combination of both. For example, a resolver may determine from the encoded parameters in the contextual part what target application the resource ID is associated with. This process is discussed in greater detail below.

As shown, the navigation management system 130 may also include a resource ID generator 144. The resource ID generator 144 may be operable to generate a resource ID for a specified target application. For example, the resource ID generator 144 may be operable to produce a normalized textual representation including a description of the target application. The resource ID generator 144 may also be operable to produce a contextual identifier including an encoded representation of the call to the application. For example, the contextual identifier may include one or more parameters to be passed to the application when it is run. An application developer may utilize the resource ID generator 144 to generate resource IDs that can then be embedded within URLs included in an application. When the URLs are activated by a user, the target applications associated with those resource IDs may be instantiated.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The navigation service system 130 also includes a memory 150 or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the navigation service system 130. Additionally, the memory 150 may include any other appropriate data, such as VPN applications, firmware logs and policies, firewall policies, a security or access log, print or other reporting files, as well as others.

As illustrated in FIG. 1, memory 150 includes or references data and information associated with and/or related to providing the network service load control. As illustrated, memory 150 includes a database 160. The database 160 may be one of or a combination of several commercially available database and non-database products. Acceptable products include, but are not limited to, SAP® HANA DB, SAP® MaxDB, Sybase® ASE, Oracle® databases, IBM® Informix® databases, DB2, MySQL, Microsoft SQL Server®, Ingres®, PostgreSQL, Teradata, Amazon SimpleDB, and Microsoft® Excel, as well as other suitable database and non-database products. Further, database 160 may be operable to process queries specified in any structured or other query language such as, for example, Structured Query Language (SQL).

As shown, the database 160 includes one or more resource IDs 162. In some implementations, the resource IDs 162 are stored in the database 160 in the same encoded form in which they appear in a request. For example, the resource IDs 162 may include a textual identifier, a separator, and an encoded contextual identifier. In some cases, the resource IDs 162 may be stored in the database in decoded form, such that the contextual identifier is not encoded. In some cases, resource IDs can be not stored in database at all, and persist only in generated URL.

One or more target applications 164 are also included in the database 160. The target applications 164 are associated to the resource IDs 162. In some cases, one or more target applications 164 may be associated with each of the resource IDs 162. In some implementations, each target application 164 is stored as a URL associated with the application. Target applications 164 may also include any other identifier for the applications, such as IP addresses, or another unique identifier.

Illustrated client 180 is intended to encompass any computing device, such as a desktop computer, laptop/notebook computer, wireless data port, smart phone, personal data assistant (PDA), tablet computing device, one or more processors within these devices, or any other suitable processing device. For example, client 180 may comprise a computer that includes an input device, such as a keypad, touch screen, or other device that can accept user information and an output device that conveys information associated with the operation of the navigation management system 130 or client 180 itself, including digital data, visual information, or a graphical user interface (GUI). Client 180 may include an interface 189, a processor 184, a memory 188 and a client application 186. In some implementations, the client application 186 may be a web browser. Client 180 may be used by a user to access the navigation management system 130 to view or change items in the database 160, such as target applications 164.

Figure 2:
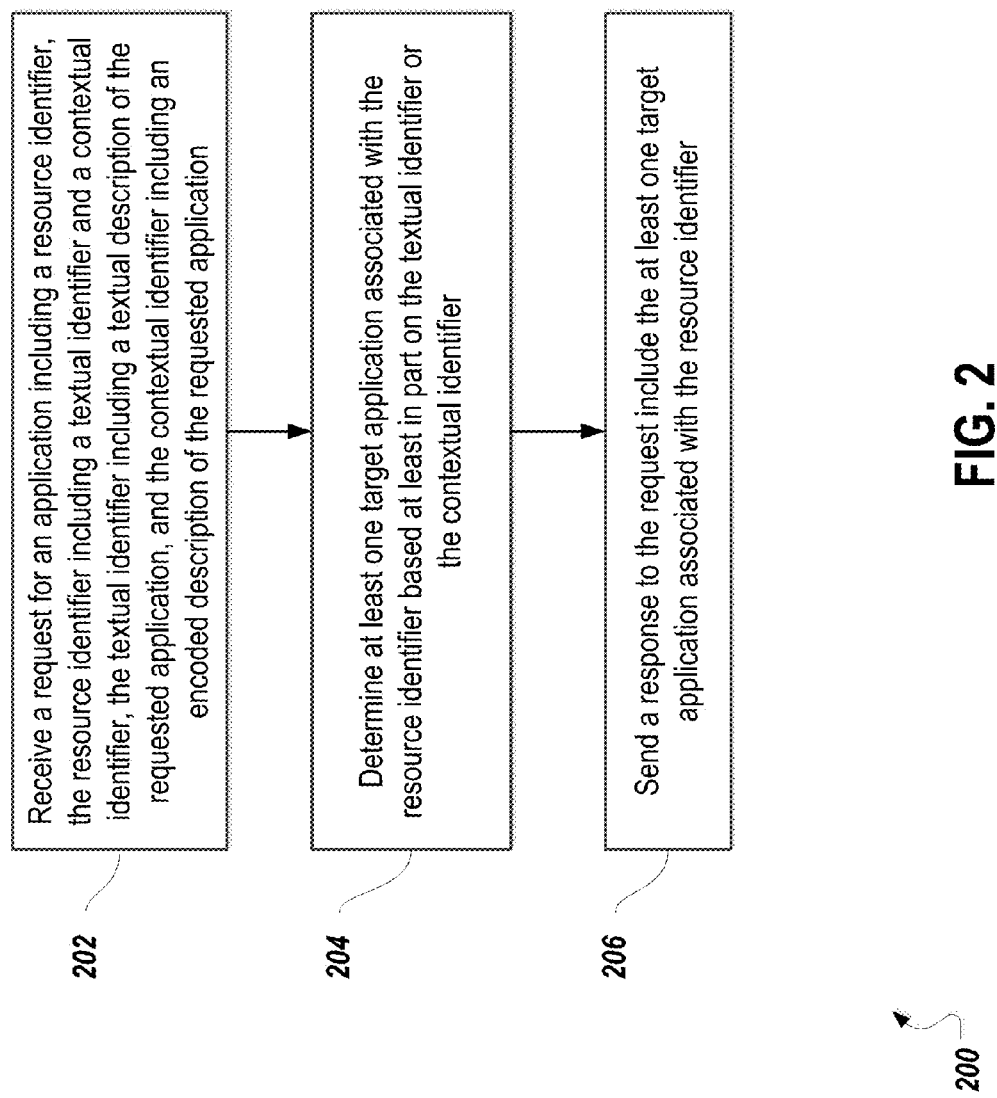
FIG. 2 is a flowchart of an example method for concise resource addressing.

FIG. 2 is a flowchart of an example method for concise resource addressing. For clarity of presentation, the description that follows generally describes method 200 in the context of FIG. 1. However, method 200 may be performed, for example, by any other suitable system, environment, software, and hardware, or a combination of systems, environments, software, and hardware, as appropriate. For example, one or more of the navigation management system, the client, or other computing device (not illustrated) can be used to execute method 200 and obtain any data from the memory of the client, navigation management system, or the other computing device (not illustrated).

At 202, a request for an application including a resource identifier is received. The resource identifier may include a textual identifier including a textual description of the requested application. In some implementations, the textual identifier includes a user intent representing an action associated with a particular business object. The resource identifier may also include a contextual identifier including an encoded description of the requested application. In some implementations, the resource identifier is formatted as shown in FIGS. 5A-C.

At 204, at least one target application associated with the resource identifier is determined based at least in part on the textual identifier or on the contextual identifier. In some implementations, determining the target application includes decoding the contextual identifier. In some cases, the determination includes identifying an encoding scheme identifier included in the contextual identifier, and decoding the contextual identifier into a contextual table based on the encoding scheme identifier. The encoding scheme identifier may be a compression scheme identifier, and decoding the contextual identifier may include decompressing the contextual identifier. In some cases, the contextual table includes a resolver class identifier, and determining the at least one target application is performed based at least in part on the resolver class identifier. The contextual table may also include one or more parameters associated with the requested application. In some cases, a target application may not be able to be determined for the resource identifier, and the requester may be notified by a response including zero target applications.

In some implementations, determining the target application includes identifying a set of target applications based at least in part on the textual identifier or the contextual identifier, and ranking each target application in the set of target applications based on a degree of similarity to the textual identifier. In some cases, the at least one target application may be a resource identifier, and which may be recursively resolved until a target application is obtained (a process known as "deep resolving."). In some cases, the resource identifier may be transformed according to a locale associated with the resolver prior to determining the target application. In some cases, the target application may be determined from a resource ID including a blank textual or contextual identifier. At 206, a response to the request is sent including the at least one target application associated with the resource identifier.

Figure 3:
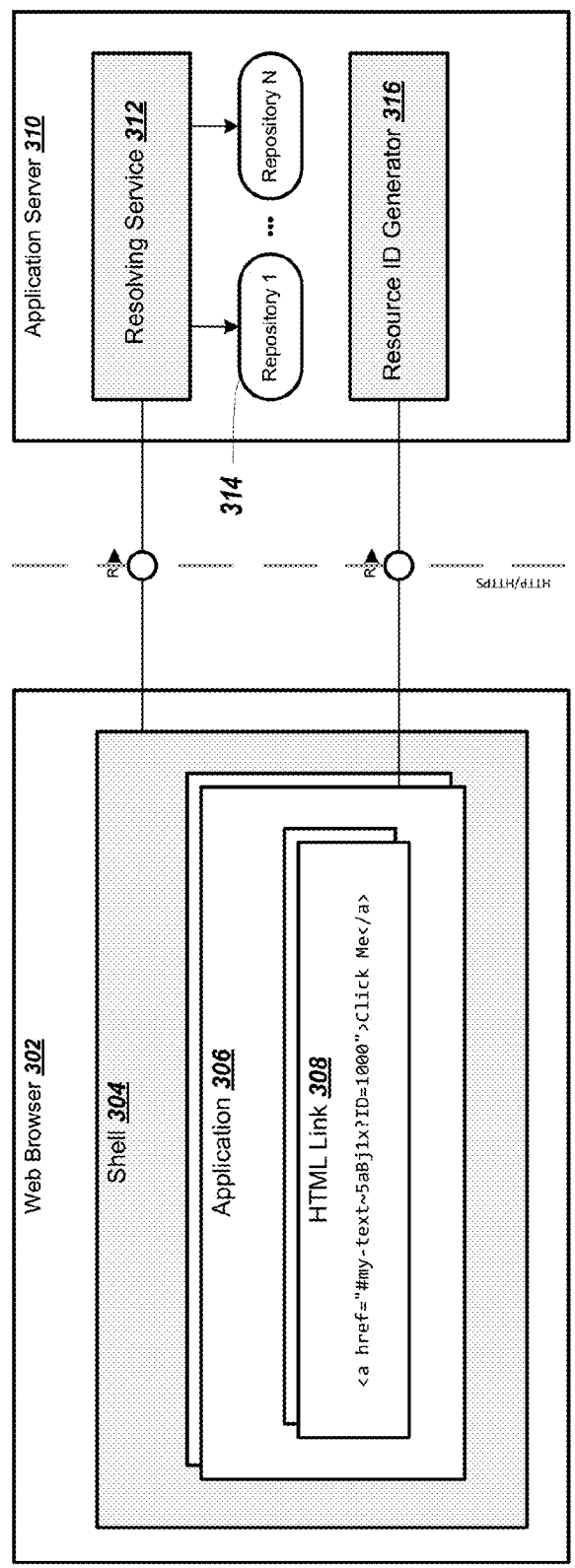
FIG. 3 is an example system showing an application including a resource identifier and an associated resolving service.

FIG. 3 is an example system showing an application including a resource identifier and an associated resolving service. As shown, a web browser 302 executes a shell 304. The shell 304 includes an application 306 that includes HTML link 308. The HTML link 308 includes a resource identifier, as shown in FIGS. 5A-5C.

When a user clicks on the HTML link 308, the messages sent to the application server 310 to resolve the resource ID included in the HTML link 308 into a target application. The resolving service 312 retrieves the one or more target applications from one of the repositories 314. A response to the request is then returned to the client. The resource ID generator 316 may be used by an application developer to generate resource IDs to embed within an application.

Figure 4:
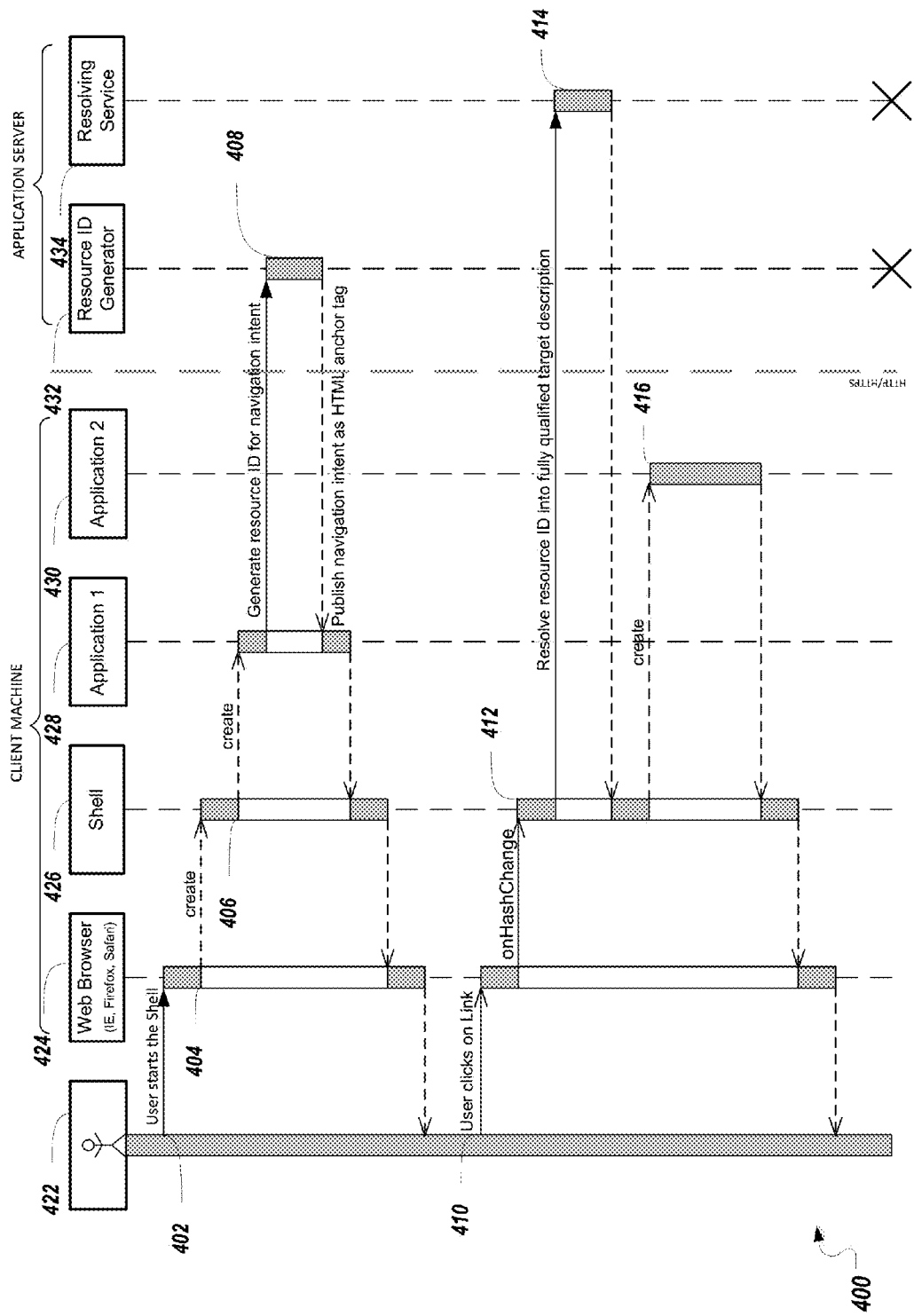
FIG. 4 is a message flow diagram showing an example of concise resource addressing.

FIG. 4 is a message flow diagram showing an example of concise resource addressing. The interaction shown in FIG. 4 involves a user 422, a web browser 424, a shell 426, a first application 428, a second application 430, or resource ID generator 432, and a resolving service 434.

At 402, the user starts the shell which in turn invokes the web browser 424. The web browser at 404 creates the shell 426. The shell in turn creates the first application 428. The first application 428 sends a request to the resource ID generator 432 to generate a resource ID for a particular navigational intent (e.g., a target application). The resource ID generator 432 responds with a resource ID, which the first application 428 embeds in an HTML tag.

At 410, the user 422 clicks on a link through the web browser 424. At 412, the web browser 424 generates and on onHashChange event to the shell 426. The shell 426 sends a request to the resolving service 434 to resolve the resource ID included in the clicked link into a fully qualified target address. At 416, the shell contacts the target address returned from the resolving service 434, in this case corresponding to the second application 430.

FIG. 5A is an example of a URL including a resource identifier. The URL 500 includes a first part 502. The first part 502 includes the server address and port, and a path to a file, in this case "shell.html." In some implementations, the first part 502 may include the domain name. The first part 502 need not necessarily include a filename, but may include any meaningful string of text we can be interpreted by an application server.

The URL 500 includes a second part 504. The second part 504 is an in-line parameter with a key of "par" and a value of "ABC", related to shell.html here or to the hosting (shell like) application in general. The third part 506 of the URL 500 is a resource identifier. In some implementations, the resource identifier is included within a hash fragment within the URL, as shown here. The specific structure of the resource identifier will be discussed in greater detail relative to FIG. 5B. The fourth part 508 of the URL 500 is another in-line parameter with the key "productID" and the value "HT-1000", related to resource identifier and send as additional parameters to application targeted by intent (resource ID).

FIG. 5B is an example resource identifier. As shown, the resource identifier includes a textual identifier 522. In some implementations, textual identifier may include a human readable description of the target application associated with the resource ID. A textual identifier may include a normalized representation of a description of the application, such as a representation with spaces removed, stop words (e.g., "the") removed, and other normalization techniques applied.

The resource identifier 520 also includes the contextual identifier 524. In some implementations, the contextual identifier 524 is encoded representation of the target application. The contextual identifier 524 may include encoded parameters to be used when calling the target application. The contextual identifier is described in more detail relative to FIG. 5C.

FIG. 5C is an example contextual identifier and an example contextual table. The contextual identifier 530 includes encoding scheme identifier 532. In some implementations, the encoding scheme identifier may be a single byte indicating how the rest of the contextual identifier is encoded. For example, an encoding scheme identifier of "1" may indicate that the rest of the contextual identifier is encoded using zip compression. In operation, an application server may read the encoding scheme identifier and perform different decoding processes on the rest of the special identifier based on the value of the encoding identifier.

The contextual identifier also includes an encoded part 534. The encoded part 534 is encoded according to the encoding scheme indicated by the identifier 532. An application server may decode the encoded part 534 to produce contextual table 538. As shown, the contextual table 538 shows the values that appear in each bite of the decoded portion of the resource ID. At position 0, a resolver class ID 540 appears. The resolver class ID 540 indicates an identity or type of resolver that should be used to handle this resource ID. In some implementations, a resolving service may include multiple resolver classes that each may implement different types of functionality. The resolver class ID may allow an application to specify which resolver class to use to resolve a particular resource ID.

The contextual table 538 also includes a series of parameters 540*a-n*. These parameters may be passed to the target application associated with the resource ID, such as bypassing them is in-line parameters in the URL, or by any other mechanism.

Figure 6:
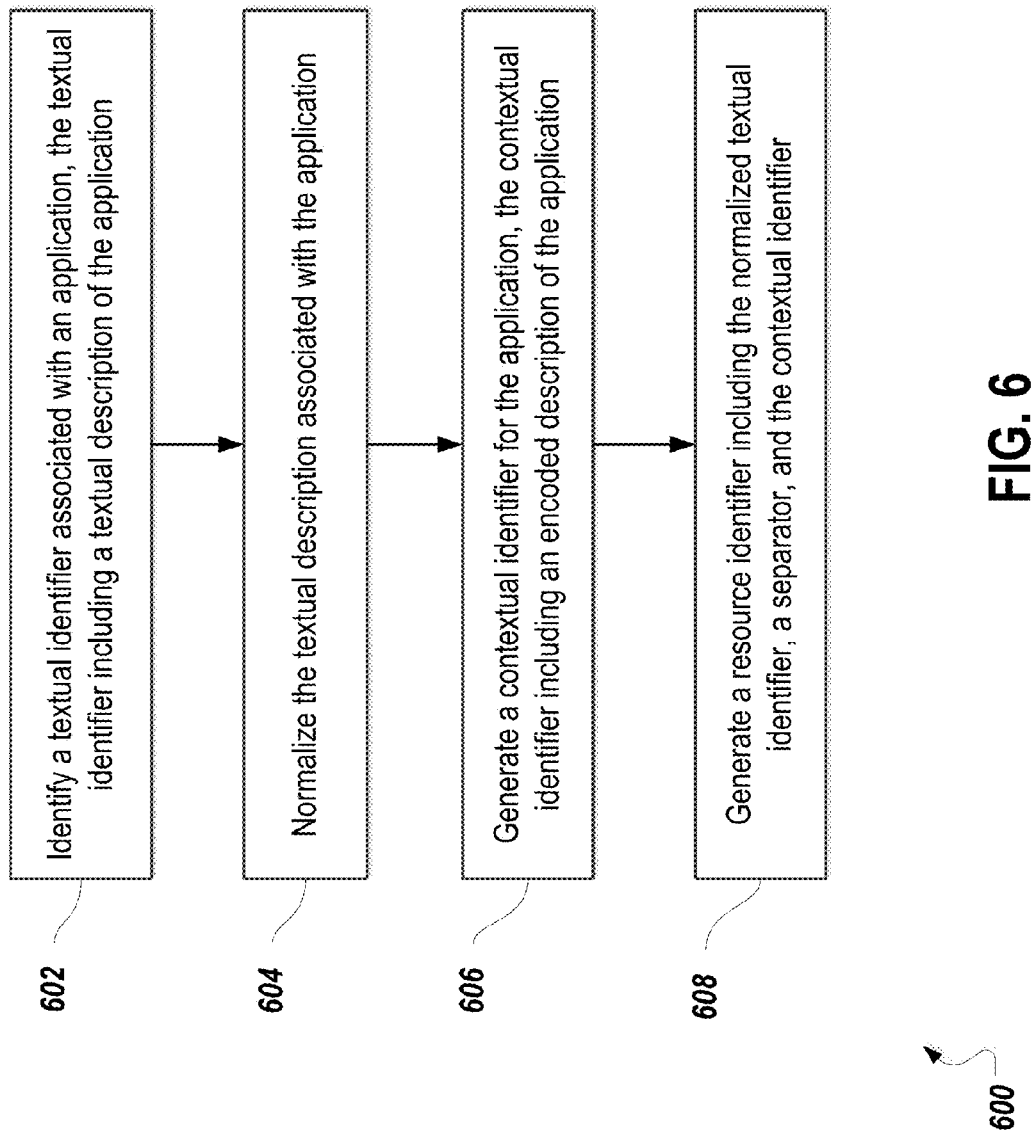
FIG. 6 is a flowchart of an example method for generating resource identifiers including textual and contextual identifiers.

FIG. 6 is a flowchart of an example method for generating resource identifiers including textual and contextual identifiers. For clarity of presentation, the description that follows generally describes method 600 in the context of FIG. 1. However, method 600 may be performed, for example, by any other suitable system, environment, software, and hardware, or a combination of systems, environments, software, and hardware, as appropriate. For example, one or more of the navigation management system, the client, or other computing device (not illustrated) can be used to execute method 600 and obtain any data from the memory of the client, navigation management system, or the other computing device (not illustrated). At 602, a textual identifier associated with an application is identified. The textual identifier may include a textual description of the application. At 604, the textual description associate with the application is normalized. In some implementations, normalizing a textual description may include removing spaces from the description, removing common words such as "the", or any other normalization mechanism. At 606, the contextual identifier for the application is generated. In some cases the contextual identifier includes an encoded description of the application. At 608, a resource ID is generated including the normalized textual identifier, a separator, and the contextual identifier.

The preceding figures and accompanying description illustrate example processes and computer implementable techniques. Environment 100 (or its software or other components) contemplates using, implementing, or executing any suitable technique for performing these and other tasks. These processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
  receiving a request for an application including a resource identifier, the resource identifier including a textual identifier and a contextual identifier, the textual identifier including a textual description of the requested application, and the contextual identifier including an encoded description of the requested application;
  determining at least one target application associated with the resource identifier based at least in part on the textual identifier or the contextual identifier, wherein determining the at least one target application comprises:
    identifying a set of target applications based at least in part on the textual identifier or the contextual identifier; and
    ranking each target application in the set of target applications based on a degree of similarity to the textual identifier; and
  sending a response to the request include the at least one target application associated with the resource identifier, where the response includes the ranked set of target applications.

2. The method of claim 1, wherein the textual identifier includes a user intent representing an action associated with a particular business object.

3. The method of claim 1, wherein determining the at least one target application comprises:
  identifying an encoding scheme identifier included in the contextual identifier; and
  decoding the contextual identifier into a contextual table based on the encoding scheme identifier.

4. The method of claim 3, wherein the encoding scheme identifier is a compression scheme identifier and decoding the contextual identifier includes decompressing the contextual identifier.

5. The method of claim 3, wherein the contextual table includes a resolver class identifier, and determining the at least one target application is performed based at least in part on the resolver class identifier.

6. The method of claim 3, wherein the contextual table includes one or more parameters associated with the requested application.

7. The method of claim 1, wherein determining the at least one target application comprises:
  determining that the at least one target application is a resource identifier; and
  determining a second target application associated with the at least one target application.

8. The method of claim 1, further comprising:
  determining that the resource identifier is associated with a first locale; and
  transforming the resource identifier according to a second locale prior to determining the at least one target application associated with the resource identifier.

9. The method of claim 1, wherein the resource identifier includes a separator between the textual identifier and the contextual identifier.

10. A non-transitory, computer-readable medium storing instructions operable when executed to cause at least one processor to perform operations comprising:
  receiving a request for an application including a resource identifier, the resource identifier including a textual identifier and a contextual identifier, the textual identifier including a textual description of the requested application, and the contextual identifier including an encoded description of the requested application;
  determining at least one target application associated with the resource identifier based at least in part on the textual identifier or the contextual identifier, wherein determining the at least one target application comprises:
    identifying a set of target applications based at least in part on the textual identifier or the contextual identifier; and
    ranking each target application in the set of target applications based on a degree of similarity to the textual identifier; and
  sending a response to the request include the at least one target application associated with the resource identifier, where the response includes the ranked set of target applications.

11. The computer-readable medium of claim 10, wherein the textual identifier includes a user intent representing an action associated with a particular business object.

12. The computer-readable medium of claim 10, wherein determining the at least one target application comprises:
  identifying an encoding scheme identifier included in the contextual identifier; and
  decoding the contextual identifier into a contextual table based on the encoding scheme identifier.

13. The computer-readable medium of claim 12, wherein the encoding scheme identifier is a compression scheme identifier and decoding the contextual identifier includes decompressing the contextual identifier.

14. The computer-readable medium of claim 12, wherein the contextual table includes a resolver class identifier, and determining the at least one target application is performed based at least in part on the resolver class identifier.

15. The computer-readable medium of claim 12, wherein the contextual table includes one or more parameters associated with the requested application.

16. The computer-readable medium of claim 10, wherein determining the at least one target application comprises:
  determining that the at least one target application is a resource identifier; and
  determining a second target application associated with the at least one target application.

17. The computer-readable medium of claim 10, further comprising:
  determining that the resource identifier is associated with a first locale; and
  transforming the resource identifier according to a second locale prior to determining the at least one target application associated with the resource identifier.

18. The computer-readable medium of claim 10, wherein the resource identifier includes a separator between the textual identifier and the contextual identifier.

19. A system comprising:
  memory for storing data; and
  one or more processors operable to perform operations comprising:
    receiving a request for an application including a resource identifier, the resource identifier including a textual identifier and a contextual identifier, the textual identifier including a textual description of the requested application, and the contextual identifier including an encoded description of the requested application;
    determining at least one target application associated with the resource identifier based at least in part on the textual identifier and the contextual identifier, wherein determining the at least one target application comprises:
      identifying a set of target applications based at least in part on the textual identifier or the contextual identifier; and
      ranking each target application in the set of target applications based on a degree of similarity to the textual identifier; and
    sending a response to the request include the at least one target application associated with the resource identifier, where the response includes the ranked set of target applications.

20. The system of claim 19, wherein the textual identifier includes a user intent representing an action associated with a particular business object.

21. The system of claim 19, wherein determining the at least one target application comprises:
  identifying an encoding scheme identifier included in the contextual identifier; and
  decoding the contextual identifier into a contextual table based on the encoding scheme identifier.

22. The system of claim 21, wherein the encoding scheme identifier is a compression scheme identifier and decoding the contextual identifier includes decompressing the contextual identifier.

23. The system of claim 21, wherein the contextual table includes a resolver class identifier and one or more parameters associated with the requested application, and determining the at least one target application is performed based at least in part on the resolver class identifier.

24. The system of claim 19, wherein determining the at least one target application comprises:
  determining that the at least one target application is a resource identifier; and
  determining a second target application associated with the at least one target application.

25. The system of claim 19, further comprising:
  determining that the resource identifier is associated with a first locale; and
  transforming the resource identifier according to a second locale prior to determining the at least one target application associated with the resource identifier.

26. The system of claim 19, wherein the resource identifier includes a separator between the textual identifier and the contextual identifier.

* * * * *